(12) United States Patent
Funada et al.

(10) Patent No.: US 10,967,647 B2
(45) Date of Patent: Apr. 6, 2021

(54) FILTER UNIT, LIQUID DISCHARGING HEAD, AND LIQUID DISCHARGING APPARATUS

(71) Applicant: SEIKO EPSON CORPORATION, Tokyo (JP)

(72) Inventors: Shuji Funada, Shiojiri (JP); Ken Yamagishi, Shiojiri (JP); Shigeki Suzuki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/555,873

(22) Filed: Aug. 29, 2019

(65) Prior Publication Data

US 2020/0070538 A1 Mar. 5, 2020

(30) Foreign Application Priority Data

Aug. 31, 2018 (JP) .............................. JP2018-162987

(51) Int. Cl.
*B41J 2/19* (2006.01)
*B01D 19/00* (2006.01)
*B41J 2/175* (2006.01)

(52) U.S. Cl.
CPC ............ *B41J 2/19* (2013.01); *B01D 19/0031* (2013.01); *B41J 2/17563* (2013.01)

(58) Field of Classification Search
CPC .......... B41J 2/19; B41J 2/17563; B41J 2/175; B01D 19/0031
See application file for complete search history.

(56) References Cited

U.S. PATENT DOCUMENTS

2014/0263701 A1* 9/2014 Gonzales ................. B41J 2/175
239/8
2016/0059576 A1 3/2016 Ito et al.

FOREIGN PATENT DOCUMENTS

JP 2016-049725 4/2016

* cited by examiner

*Primary Examiner* — Justin Seo
(74) *Attorney, Agent, or Firm* — Workman Nydegger

(57) ABSTRACT

A first recess and a second recess are formed in a wall surface of the second space, a projection is formed between the first recess and the second recess, a first coupling port is formed in the first recess, a second coupling port is formed in the second recess, the projection extends in a direction of crossing between the first coupling port and the second coupling port, and a distance, between the first coupling port and a front end portion, in a first direction as a direction toward the first coupling port from the second coupling port among directions in a plane of the filter is smaller than a distance in the first direction between the first coupling port and one end portion of the projection and is smaller than a distance in the first direction between the first coupling port and another end portion of the projection.

15 Claims, 9 Drawing Sheets

FILTER UNIT, LIQUID DISCHARGING HEAD, AND LIQUID DISCHARGING APPARATUS

The present application is based on, and claims priority from JP Application Serial Number 2018-162987, filed Aug. 31, 2018, the disclosure of which is hereby incorporated by reference herein in its entirety.

BACKGROUND

1. Technical Field

The present disclosure relates to a filter unit, a liquid discharging head, and a liquid discharging apparatus.

2. Related Art

A flow path member in the related art having a filter chamber in which an upstream portion and a downstream portion in a liquid flow direction are separated by a filter extending in a horizontal direction has been known as a part of a flow path through which liquid flows (for example, JP-A-2016-049725). In the flow path member, an upstream filter chamber of the filter chamber, which is located upstream, is located on the upper side in the vertical direction relative to a downstream filter chamber thereof, which is located downstream. An opening for the liquid to flow into the filter chamber is formed in the upstream filter chamber so as to face the filter. In addition, an opening for the liquid to flow out from the filter chamber is formed in the downstream filter chamber of the filter chamber, which is located downstream, so as to face the filter. Therefore, in a normal use state, the liquid flows in the filter chamber from the upper side to the lower side in the vertical direction.

Air bubbles may be contained in the liquid flowing in the flow path member. Accordingly, the air bubbles may flow into the downstream filter chamber with movement of the liquid. The inventors have found that in the related art, when the flow path member is used such that the filter chamber is inclined, the air bubbles which have flowed into the downstream filter chamber move upward in the vertical direction by buoyancy and are possibly accumulated in an upper end portion of the filter chamber.

SUMMARY

According to an aspect of the present disclosure, a filter unit is provided. The filter unit includes a flow path member configuring a filter chamber through which liquid flows, and a filter partitioning the filter chamber into a first space located upstream in a liquid flow direction and a second space located downstream in the liquid flow direction, in which a first recess and a second recess as two recesses recessed in a direction of being farther from the filter are formed in a wall surface of the second space in a wall surface of the flow path member, a projection projecting toward the filter is formed between the first recess and the second recess in the wall surface, a first coupling port through which the liquid flows to an outside of the filter chamber from the second space is formed in the first recess, a second coupling port through which the liquid flows to the outside of the filter chamber from the second space is formed in the second recess, the projection extends in a direction of crossing between the first coupling port and the second coupling port when a second space side is viewed from a first space side, and when a portion of the projection between one end portion and another end portion in the crossing direction represents a front end portion, a distance between the first coupling port and the front end portion in a first direction, among directions in a plane of the filter, as a direction toward the first coupling port from the second coupling port is smaller than a distance between the first coupling port and the one end portion in the first direction and is smaller than a distance between the first coupling port and the other end portion in the first direction.

DESCRIPTION OF EXEMPLARY EMBODIMENTS

A. First Embodiment

A1. Configuration of Liquid Discharging Apparatus

Figure 1:
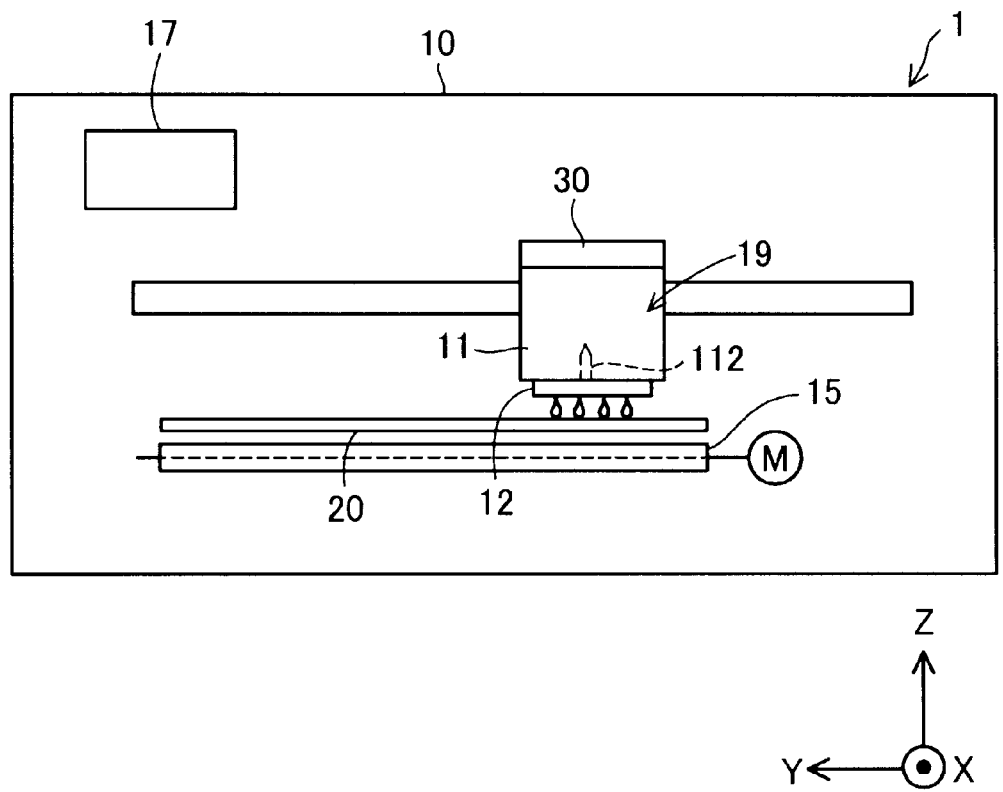
FIG. 1 is a schematic view illustrating the internal configuration of a liquid discharging apparatus.

FIG. 1 is a schematic view illustrating the internal configuration of a liquid discharging apparatus 1. The liquid discharging apparatus 1 is a so-called ink jet printer and performs printing on a medium 20 by discharging ink as liquid onto the medium 20. The medium 20 is a printing medium such as a paper sheet, a sheet material, a cloth, or the like. For the ink, for example, aqueous ink or solvent ink can be used. In the embodiment, the aqueous ink is used as the ink. An X axis, a Y axis, and a Z axis as three spatial axes, which are orthogonal to each other, are depicted in FIG. 1. A direction along the X axis is defined as an X-axis direction, a direction along the Y axis is defined as a Y-axis direction, and a direction along the Z axis is defined as a Z-axis direction. The liquid discharging apparatus 1 is disposed on a plane parallel to an XY plane defined by the X-axis direction and the Y-axis direction. The −Z-axis direction is a vertical downward direction, and the +Z-axis direction is a vertical upward direction. In the other figures which will be described later, the Z axis is provided as necessary.

The liquid discharging apparatus 1 includes, in an outer shell 10, a transportation mechanism 15 transporting the medium 20, a controller 17, a carriage 19, and a liquid supply source 30 mounted on the carriage 19 in a detachable manner. The transportation mechanism 15 includes a motor M as a power source. The carriage 19 includes a head unit 12 which functions as a liquid discharging head that discharges liquid to the outside. The controller 17 controls various operations of the liquid discharging apparatus 1, for example, a printing operation. In the embodiment, the liquid supply source 30 is a liquid tank capable of accommodating the liquid therein.

The carriage 19 includes the head unit 12 and a mounting portion 11 arranged on the head unit 12. The mounting portion 11 has, for example, a recess shape which is open in the +Z-axis direction and which forms a mounting space in which the liquid supply source 30 is mounted. The mounting portion 11 has a liquid introduction needle portion 112 projecting, in the +Z-axis direction, from a lower surface that defines the mounting space. The liquid introduction needle portion 112 is coupled to the liquid supply source 30. The liquid introduction needle portion 112 is hollow, and a communication hole communicating with the inside is formed on a front end side. The liquid supplied from the liquid supply source 30 flows into the liquid introduction needle portion 112 via the communication hole of the liquid introduction needle portion 112. The head unit 12 communicates with the liquid introduction needle portion 112 to discharge the liquid supplied from the liquid supply source 30 onto the medium 20.

A2. Configuration of Liquid Discharging Head Unit

Figure 2:
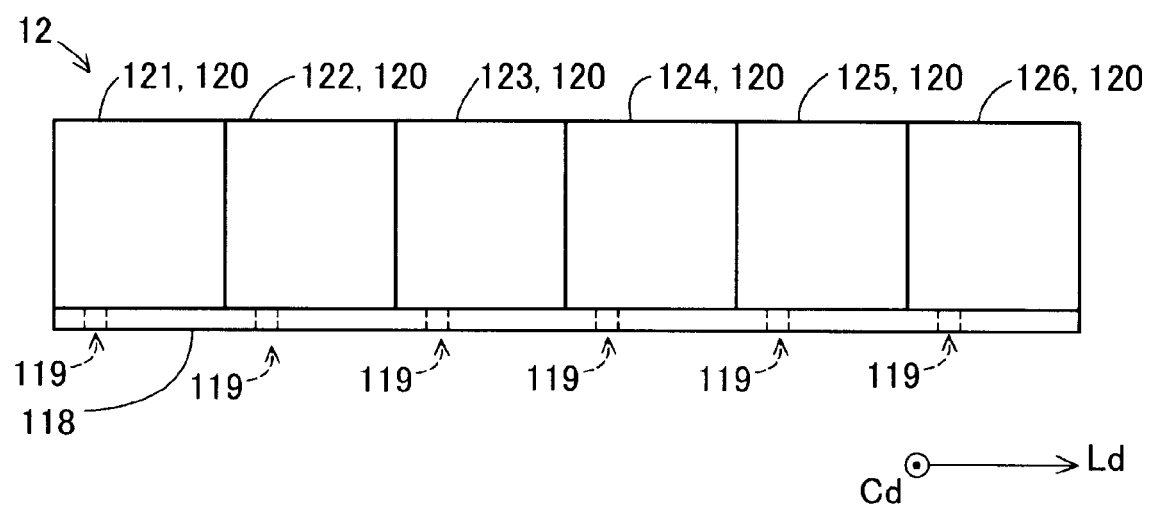
FIG. 2 is a schematic view illustrating the configuration of a head unit according to a first embodiment.

FIG. 2 is a schematic view illustrating the head unit 12 according to the first embodiment. The head unit 12 includes six head chips 121 to 126 and a plate 118. In FIG. 2, an Ld direction as a direction in which head chips 120 are aligned is illustrated. A Cd direction as a direction, in directions along the plate 118, orthogonal to the Ld direction is illustrated. In the following description, when common functions and configurations of the head chips 121 to 126 are described, the head chips 121 to 126 are also referred to as the head chips 120. The number of head chips 120 is not limited to six and may be equal to or less than five or equal to or more than seven.

The plate 118 is a plate-like member to which the six head chips 120 can be fixed in a state of being aligned in a row. The plate 118 has nozzles 119 for discharging the liquid at least one for each of the head chips 121 to 126. In addition, in order to provide the nozzles in the plate 118, the nozzles 119 may be provided in the plate 118 itself or a nozzle plate (not illustrated) in which the nozzles 119 are provided may be fixed to the plate 118.

The head chips 120 have therein flow path structures for allowing the liquid supplied from the liquid supply source 30 to flow therethrough. Further, the head chips 121 to 126 apply power to the liquid flowing therein for the liquid to be discharged through the nozzles 119.

Figure 3:
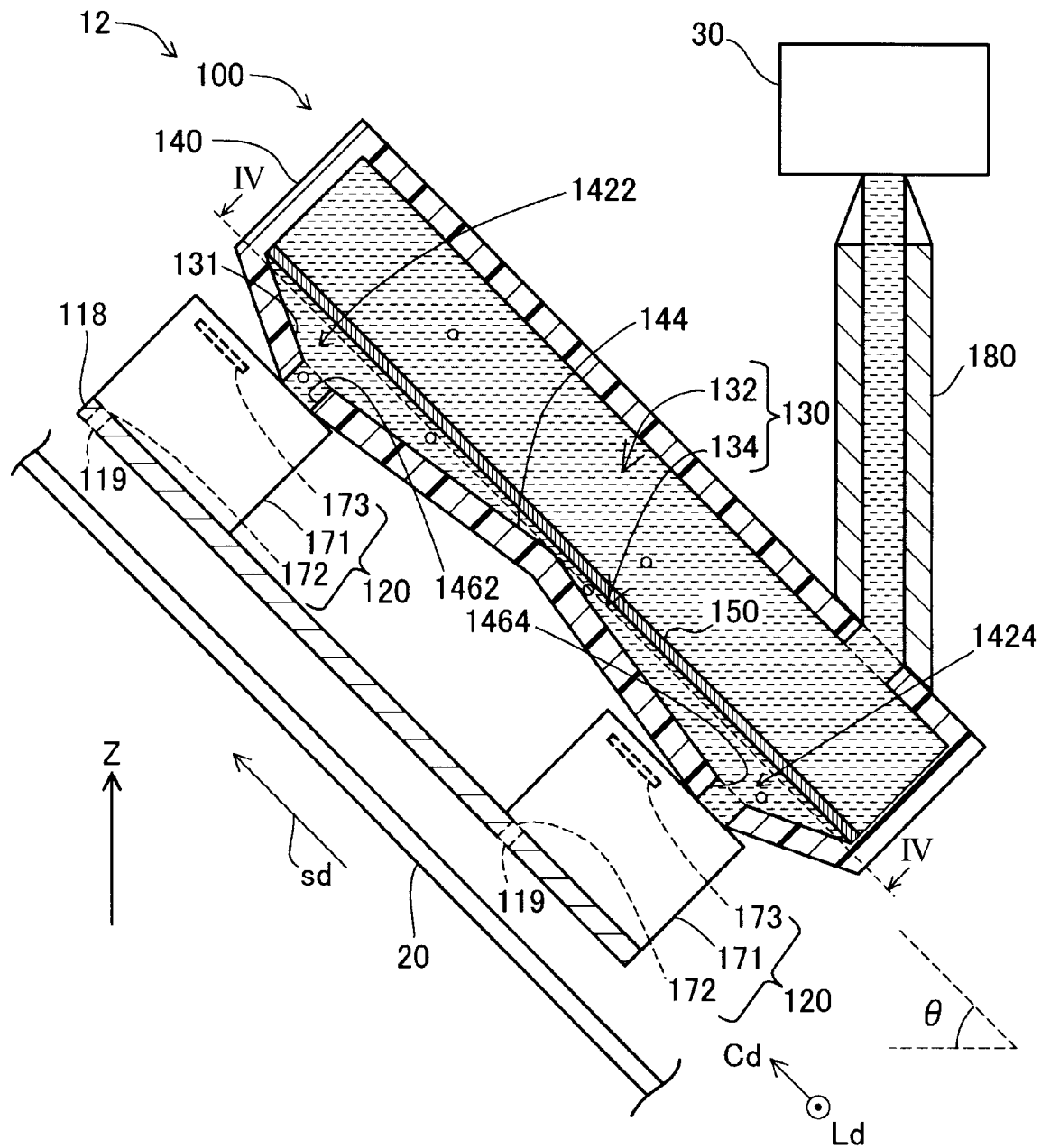
FIG. 3 is another schematic view illustrating the configuration of the head unit according to the first embodiment.

FIG. 3 is another schematic view illustrating the head unit 12 according to the first embodiment. The head unit 12 is coupled to the liquid supply source 30 with a coupling flow path 180 interposed therebetween. In FIG. 3, two head chips 120 are coupled to one filter unit 100 in the head unit 12. In the embodiment, the filter unit 100 and the head chips 120 are integrated with each other. In a normal use state, the upper side of a paper plane in FIG. 3 is the +Z-axis direction side and the lower side of the paper plane is the −Z-axis direction side.

In the embodiment, a transportation direction sd on at least the surface of the medium 20, which receives the liquid, forms an acute angle with respect to the horizontal direction. For example, an angle θ formed between the transportation direction sd and the horizontal direction (XY plane in FIG. 1) is set to be equal to or more than 30° and less than 90°, and more preferably equal to or more than 45° and less than 90°. In the embodiment, the angle θ is 60°. As illustrated in FIG. 3, the six head chips 120 include the head chips 120 located at different positions in the Z-axis direction. That is, the six head chips 120 are arranged in a zigzag manner. In the embodiment, the phrase "arranged in a zigzag manner" means that there are equal to or more than two columns in which the head chips 120 are aligned at regular intervals and that the head chips 120 in the adjacent columns are alternately arranged. The head chips 120 are included in the liquid discharging apparatus 1 so as to discharge the liquid onto the medium 20 substantially perpendicularly. More specifically, in the embodiment, the head chips 120 are included in the liquid discharging apparatus 1 such that the Cd direction and the transportation direction sd are parallel to each other. Since the transportation direction sd of the medium 20 can be inclined with respect to the horizontal direction, the liquid discharging apparatus 1 (FIG. 1) can reduce a transportation distance of the medium 20 in the horizontal direction. Therefore, even when the size of the medium 20 is increased, an increase in the size of the liquid discharging apparatus 1 due to ensuring of the transportation distance of the medium 20 in the horizontal direction can be suppressed.

The filter unit 100 separates foreign matter contained in the liquid flowing in a filter chamber 130 from the liquid and supplies the liquid from which the foreign matter has been separated to the head chips 120. The foreign matter contained in the liquid is generated, for example, by drying of part of the liquid. The foreign matter also includes air bubbles in the liquid. The filter unit 100 includes a flow path member 140 and a filter 150.

The flow path member 140 defines the filter chamber 130 as an internal space through which the liquid can flow. The filter chamber 130 is a part of a flow path for allowing the liquid to flow from the liquid supply source 30 to the head chips 120. In the embodiment, the flow path member 140 is made of synthetic resin such as polypropylene. FIG. 3 illustrates a schematic section of the flow path member 140 when the flow path member 140 is cut along a line passing through two coupling ports 1462 and 1464 provided in the filter chamber 130.

The filter 150 is arranged in the filter chamber 130 so as to partition the filter chamber 130 into a first space 132 and a second space 134. The first space 132 is an upstream space of the spaces partitioned by the filter 150 in the liquid flow direction. The second space 134 is a downstream space of the spaces partitioned by the filter 150 in the liquid flow direction. In the embodiment, the filter 150 is arranged such that a filter surface intersects the XY plane (FIG. 1). The first space 132 is thereby located upstream relative to the second space 134.

The filter 150 captures the foreign matter contained in the liquid flowing from the first space 132 side to the second space 134 side, thereby reducing movement of the foreign matter from the first space 132 side to the second space 134 side. Thus, even when the foreign matter flows into the filter chamber 130 while passing through the coupling flow path 180, it is possible to suppress the foreign matter flowing to the downstream relative to the filter chamber 130. For the filter 150, various members having filtering performance capable of transmitting the liquid and capturing the foreign matter in a solid or gel state can be used. For the filter 150, for example, a metal filter, a nonwoven fabric filter, an electroformed filter, or the like can be used. The metal filter may be a metal fiber processed into a net shape or a porous plate-like metal member. In the embodiment, a stainless steel plate having a plurality of holes formed therein is used. For example, press working is used for processing the stainless steel plate.

The head chips 120 discharge the liquid supplied from the filter unit 100 onto the medium 20 (FIG. 1). Each head chip 120 includes a body portion 171 in which an internal space (not illustrated) accommodating the liquid is formed, a nozzle hole 172 serving as an opening for discharging the liquid supplied from the filter unit 100 to the outside, and an energy generating element 173. The energy generating element 173 applies, to the liquid flowing in the head chip 120, power for the liquid to be discharged to the outside. The energy generating element 173 is, for example, a piezoelectric actuator. In the embodiment, a piezoelectric method is employed for the head chips 120. The piezoelectric-type head chips 120 discharge the liquid through the nozzle holes 172 by varying the volumes of the body portions 171 using the piezoelectric actuators. The liquid discharged through the nozzle holes 172 is discharged from the head unit 12 onto the medium 20 via the nozzles 119.

Two recesses 1422 and 1424, one projection 144, and two coupling ports 1462 and 1464 are formed in a wall surface 131, which faces the filter 150, of the second space 134 of the flow path member 140.

In the two recesses 1422 and 1424, the wall surface 131 is recessed in the direction of being farther from the filter 150. The first recess 1422 of the two recesses 1422 and 1424 in the wall surface 131 is located on the upper side and the second recess 1424 thereof is located on the lower side. In the embodiment, the recesses 1422 and 1424 have structures in which a distance between the filter 150 and the wall surface 131 gradually increase toward portions of the recesses 1422 and 1424 with larger distances from the filter 150.

The projection 144 is formed between the first recess 1422 and the second recess 1424. The projection 144 projects toward the filter 150. The distance between the filter 150 and the wall surface 131 is thereby reduced between the filter 150 and the projection 144. A gap allowing at least air bubbles to flow therethrough is formed between the projection 144 and the filter 150. Therefore, the speed of air bubbles moving between the filter 150 and the projection 144 is higher than the speed of air bubbles moving in the other regions in the second space 134. A minimum distance between the filter 150 and the wall surface 131 is preferably equal to or less than 50%, and more preferably equal to or less than 20%, of a maximum distance between the filter 150 and the wall surface 131.

The two coupling ports 1462 and 1464 are openings for the liquid to flow to the outside from the filter chamber 130. The two coupling ports 1462 and 1464 are provided such that their positions are different from each other in the vertical direction (Z-axis direction). The first coupling port 1462, which is one of the two coupling ports 1462 and 1464, is formed in the first recess 1422. The second coupling port 1464, which is the other of the two coupling ports 1462 and 1464, is formed in the second recess 1424. It is preferable that the first coupling port 1462 be provided at a position with the largest distance from the filter 150 in the first recess 1422. Further, it is preferable that the second coupling port 1464 be provided at a position with the largest distance from the filter 150 in the second recess 1424. In the embodiment, a first direction from the second coupling port 1464 to the first coupling port 1462 among directions in a plane of the filter 150 coincides with the Cd direction. In the embodiment, the first coupling port 1462 and the second coupling port 1464 are respectively coupled to the different head chips 120. In addition, the flow of the liquid downstream of the first coupling port 1462 and the flow of the liquid downstream of the second coupling port 1464 do not join with each other.

Figure 4:
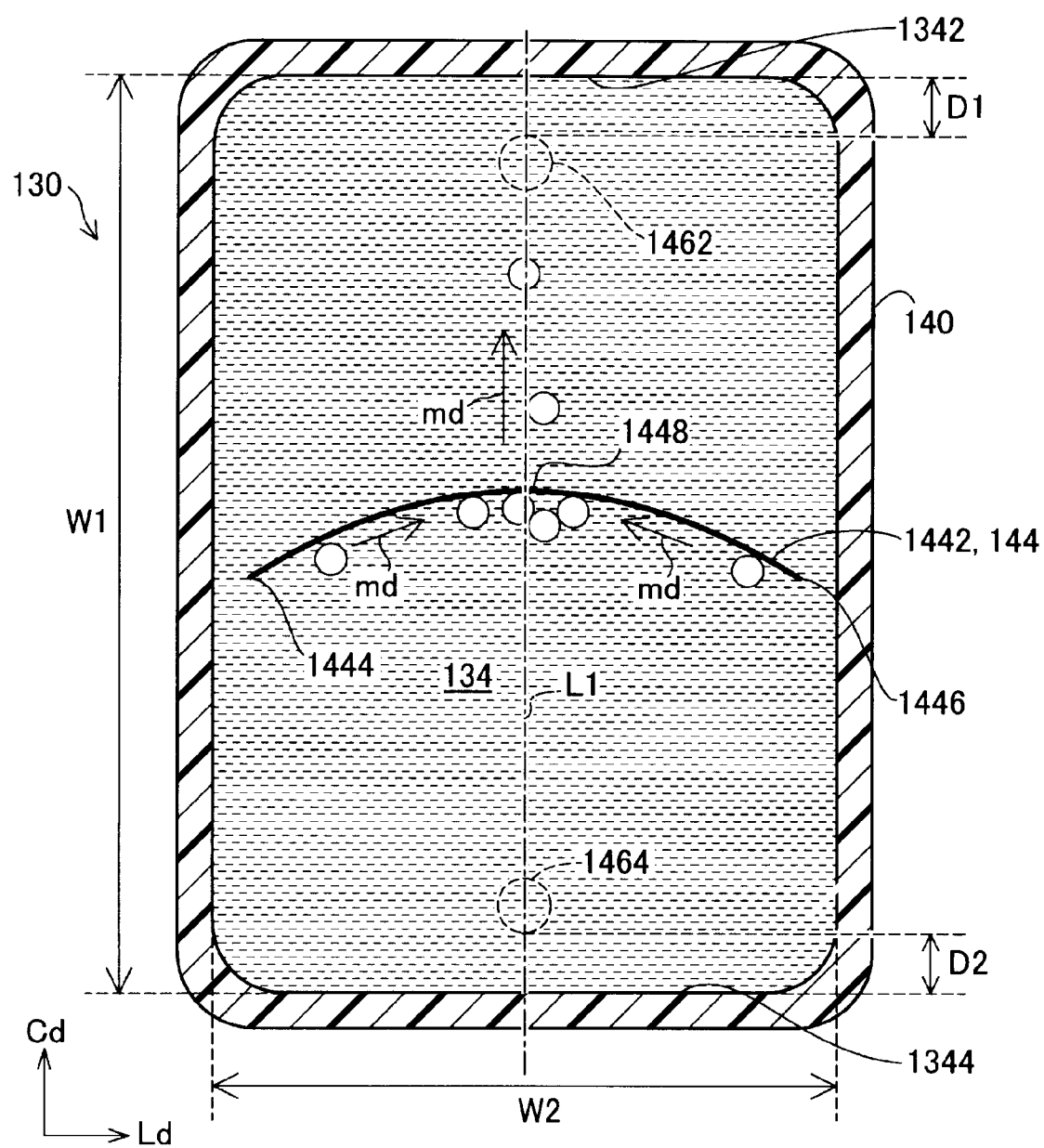
FIG. 4 is a schematic sectional view illustrating a section along IV-IV in FIG. 3.

FIG. 4 is a schematic sectional view illustrating a section along IV-IV in FIG. 3. FIG. 4 illustrates a state when the second space 134 side is viewed from the first space 132 side. In FIG. 4, a ridge portion 1442 of the projection 144 is illustrated. The ridge portion 1442 indicates a portion of the projection 144, which is closest to the filter 150 in the Cd direction. In the following description, when the position of the projection 144 is to be described, the ridge portion 1442 is used as a reference.

As illustrated in FIG. 4, the projection 144 extends in a direction intersecting the Cd direction between the first coupling port 1462 and the second coupling port 1464. That is, the projection 144 extends in a direction crossing between the first coupling port 1462 and the second coupling port 1464. When the second space 134 side is viewed from the first space 132 side, the projection 144 has a portion closer to the first coupling port 1462 than one end portion 1444 and the other end portion 1446 of the projection 144 in terms of a distance to the first coupling port 1462 in the Cd direction. In other words, when the second space 134 side is viewed from the first space 132 side, a front end portion 1448, which is a portion of the projection 144 with the smallest distance to the first coupling port 1462 in the Cd direction, is other than the one end portion 1444 and the other end portion 1446. In the embodiment, the front end portion 1448 of the projection 144 is positioned at a position substantially overlapping a straight line L1 connecting the second coupling port 1464 and the first coupling port 1462. The front end portion 1448 is a portion of the projection 144 with the smallest distance to the first coupling port 1462 in the Cd direction. That is, when the second space 134 side is viewed from the first space 132 side, the projection 144 has the front end portion 1448 that projects toward the first coupling port 1462. In the embodiment, the position substantially overlapping the straight line L1 means that a distance between the straight line L1 and the front end portion 1448 is equal to or less than 10% of a distance between the front end portion 1448 and the first coupling port 1462.

In the embodiment, when the second space 134 side is viewed from the first space 132 side, the shape of the filter chamber 130 is substantially rectangular. A first maximum width W1 of the filter chamber 130 in the Cd direction is larger than a second maximum width W2 in the Ld direction. The first maximum width W1 is preferably equal to or larger than 1.2 times the second maximum width W2, and is more preferably equal to or larger than 1.5 times the second maximum width W2. In the embodiment, the first maximum width W1 is approximately 1.5 times the second maximum width W2. In the embodiment, the shape of the filter 150 when the second space 134 side is viewed from the first space 132 side is the same as that of the internal space of the filter chamber 130. Therefore, a maximum width of the filter 150 in the Cd direction is the same as the first maximum width W1 of the filter chamber 130. A maximum width of the filter 150 in the Ld direction is the same as the second maximum width W2 of the filter chamber 130. In order to fix the filter 150, the width of the filter 150 may be made larger than the width of the first space 132 or the second space 134 of the filter chamber 130.

When the second space 134 side is viewed from the first space 132 side, a distance D1 from one end portion 1342 of end portions of the filter chamber 130 in the Cd direction, which is located on the first coupling port 1462 side, to the first coupling port 1462 is preferably smaller than half the first maximum width W1. Further, the distance D1 is more preferably smaller than one fourth the first maximum width W1, and still more preferably smaller than one eighth the first maximum width W1. Specifically, the distance D1 is a distance from the one end portion 1342 to a position at the outer edge of the opening of the first coupling port 1462, which is closest to the one end portion 1342.

When the second space 134 side is viewed from the first space 132 side, a distance D2 from the other end portion 1344 of the end portions of the filter chamber 130 in the Cd direction, which is located on the second coupling port 1464 side, to the second coupling port 1464 is preferably smaller than one fourth the first maximum width W1. Further, the distance D2 is more preferably smaller than one eighth the first maximum width W1. Specifically, the distance D2 is a distance from the other end portion 1344 to a position at the outer edge of the opening of the second coupling port 1464, which is closest to the other end portion 1344.

A3. Flow of Air Bubbles in Filter Unit

Air bubbles may be contained in the liquid flowing through the head chips 120. The air bubbles may be generated, for example, by the following factors. For example, the air bubbles in the head chips 120 are generated by precipitation of gas dissolved in the liquid due to increase in a temperature of the head unit 12 or change in an ambient temperature. For example, the air bubbles in the head chips 120 may also be generated by mixing of gas into the flow path due to attachment and detachment of the liquid supply source 30 or by generation of cavitation air bubbles due to ultrasonic waves generated from the piezoelectric actuators as the energy generation elements 173. In addition, the air bubbles in the head chips 120 may also be generated due to ripples of liquid levels caused by movement of the carriage 19 (FIG. 1).

In FIG. 4, flow directions of the air bubbles that have flowed into the filter chamber 130 are indicated by an arrow md. Movement of the air bubbles in the filter chamber 130 will be described below with reference to FIG. 3 and FIG. 4. The air bubbles that have not been separated from the liquid by the filter 150 move from the first space 132 (FIG. 3) to the second space 134 with the movement of the liquid. The movement of the air bubbles from the first space 132 to the second space 134 occurs, for example, when cleaning is performed, when the size of the air bubbles is smaller than the mesh size of the filter 150, or the like. In the embodiment, the cleaning is a process of discharging, through the head chip 120 to the outside, the air bubbles separated from the liquid by the filter 150 and remaining in the first space 132. Part of the air bubbles that have flowed into the second space 134 flows into the head chip 120 while passing through the second coupling port 1464. Moreover, the air bubbles that have not flowed into the head chip 120 while passing through the second coupling port 1464 move upward by buoyancy. The air bubbles which have moved upward and have reached the projection 144 move along the projection 144 as illustrated in FIG. 4. The air bubbles that have moved along the projection 144 gather at the front end portion 1448 of the projection 144, and then, move to the first coupling port 1462 side on the upper side relative to the projection 144. The air bubbles that have moved to the first coupling port 1462 side flow into the head chip 120 while passing through the first coupling port 1462. The air bubbles that have flowed into the head chips 120 are discharged to a cap (not illustrated) or the medium 20 (FIG. 1) together with the liquid. It is difficult to move the air bubbles in the Ld direction in comparison with the Cd direction in which the air bubbles can move by the buoyancy.

According to the first embodiment described above, the projection 144 has the portion with the smaller distance to the first coupling port 1462 in the Cd direction as the direction toward the first coupling port 1462 from the second coupling port 1464 than the one end portion 1444 and the other end portion 1446. Therefore, when the filter unit 100 is used such that the first coupling port 1462 is located on the upper side relative to the second coupling port 1464, the air bubbles moving from the second coupling port 1464 side to the first coupling port 1462 side move along the projection 144. As a result, the air bubbles gather at the front end portion 1448 close to the first coupling port 1462. Accordingly, outflow of the air bubbles from the first coupling port 1462 is facilitated, and it is possible to suppress accumulation of the air bubbles in an upper end portion of the filter chamber 130.

According to the first embodiment described above, since the flow path section of the second space 134 can be reduced between the filter 150 and the projection 144, the flow velocity of the air bubbles between the filter 150 and the projection 144 increases. Therefore, the movement of the air bubbles to the first coupling port 1462 is facilitated. As a result, the air bubbles are highly likely to be discharged through the first coupling port 1462 before reaching the one end portion 1342 as the upper end portion of the second space 134. Accordingly, it is possible to suppress the accumulation of the air bubbles in the upper end portion of the filter chamber 130.

According to the first embodiment described above, the first maximum width W1 of the filter chamber 130 is larger than the second maximum width W2. Therefore, when the wall surface area of the filter chamber 130 on the filter 150 side is the same, the second maximum width W2 can be reduced. By reducing the second maximum width W2, it is possible to facilitate the movement of the air bubbles to the first coupling port 1462.

According to the first embodiment described above, the distance D1 is smaller than half the first maximum width W1. Therefore, as compared to when the distance D1 from the one end portion 1342 to the first coupling port 1462 is larger than half the first maximum width W1, a region of the second space 134, which is located on the upper side relative to the first coupling port 1462, can be reduced. Accordingly, it is possible to further suppress the accumulation of the air bubbles in the upper end portion of the filter chamber 130.

According to the first embodiment described above, the distance D2 from the other end portion 1344 to the second coupling port 1464 is smaller than one fourth the first maximum width W1. Therefore, as compared to when the distance D2 is larger than one fourth the maximum width W1 from the other end portion 1344 to the one end portion 1342, the region of the second space 134, which is located on the lower side relative to the second coupling port 1464, can be reduced. Accordingly, even when the filter unit 100 is used such that the first coupling port 1462 and the second coupling port 1464 are horizontal, it is possible to suppress the accumulation of the air bubbles in the filter chamber 130 on the other end portion 1344 side. The case in which the filter unit 100 is used to be horizontal corresponds to, for example, the case in which the filter unit 100 is used in a model differing from the liquid discharging apparatus 1, an inspection apparatus for the head unit 12, or the like.

B. Second Embodiment

Figure 5:
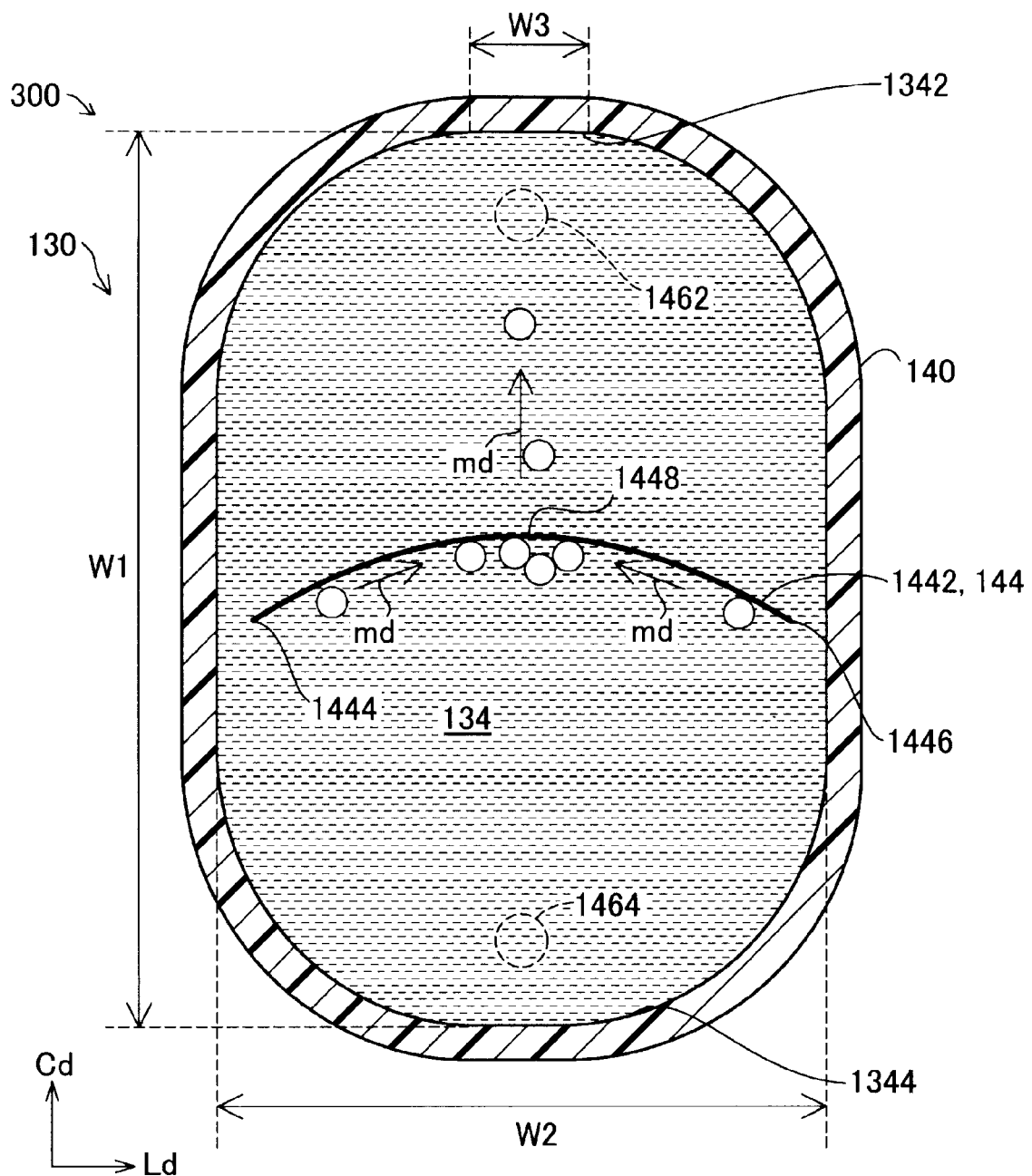
FIG. 5 is a schematic view of a filter unit according to a second embodiment.

FIG. 5 is a schematic view of a filter unit 300 according to a second embodiment. FIG. 5 illustrates a sectional view at a position corresponding to the cutting plane illustrated in FIG. 3. The filter unit 300 is different from the filter unit 100 according to the first embodiment in that a width W3 of the one end portion 1342 of the second space 134 in the Ld direction is small. In the following description, the same components as those in the first embodiment are denoted by the same reference numerals, and detailed description thereof will not be repeated.

According to the second embodiment described above, the same effects as those provided by the above-described first embodiment can be obtained regarding points having the same configurations as those in the first embodiment. With the filter unit 300 according to the second embodiment, air bubbles that have moved to the second space 134 move along the wall surface of the second space 134. As a result, the air bubbles move to the center side at the one end portion 1342. Therefore, the air bubbles can be made to gather around the first coupling port 1462. Accordingly, the air bubbles can be easily discharged through the first coupling port 1462.

C. Third Embodiment

Figure 6:
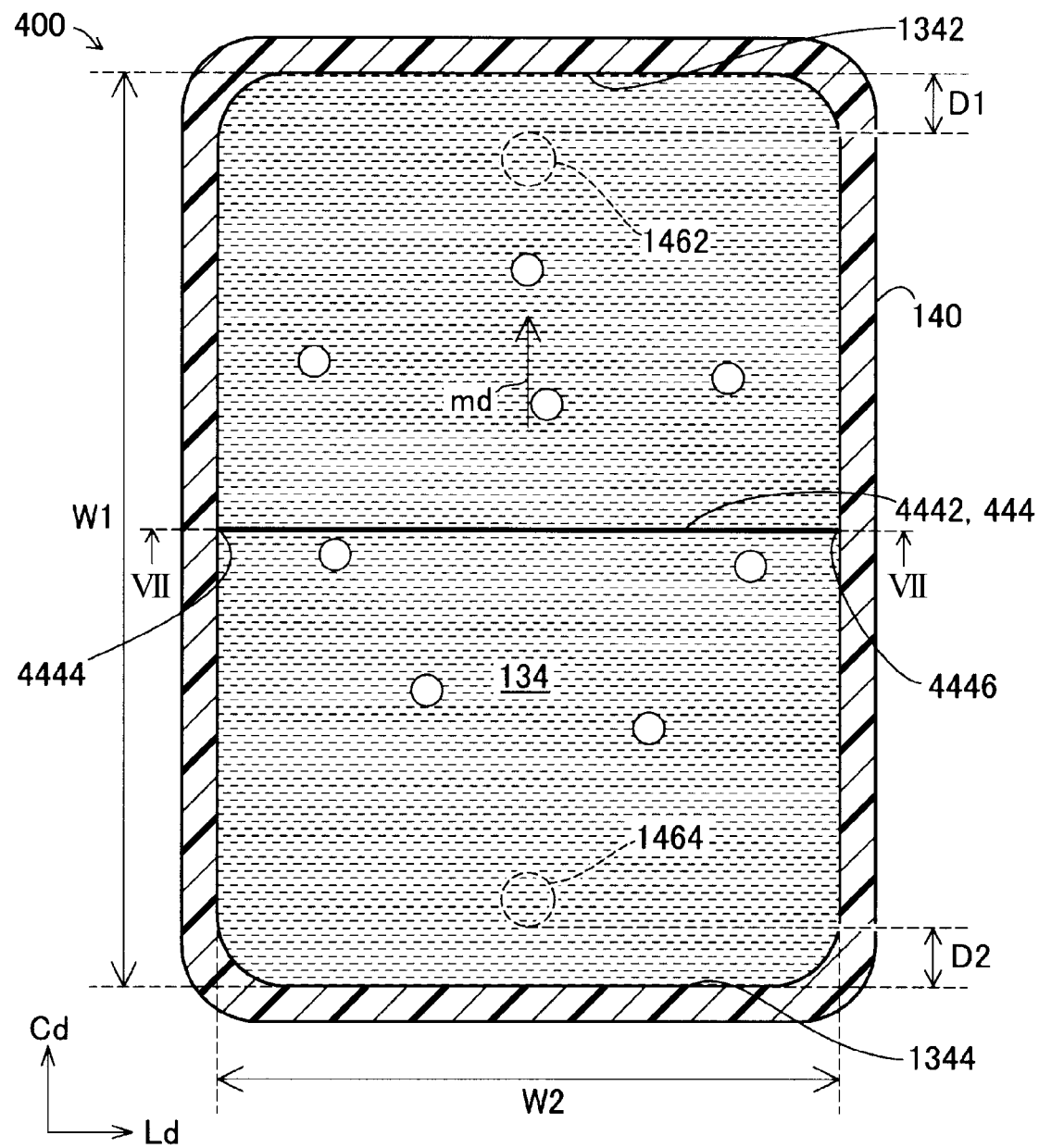
FIG. 6 is a schematic view of a filter unit according to a third embodiment.

FIG. 6 is a schematic view of a filter unit 400 according to a third embodiment. FIG. 6 illustrates a sectional view at a position corresponding to the cutting plane illustrated in FIG. 3. The filter unit 400 is different from the filter unit 100 according to the first embodiment in that a projection 444 does not project toward the first coupling port 1462. In the following description, the same components as those in the first embodiment are denoted by the same reference numerals, and detailed description thereof will not be repeated.

Figure 7:
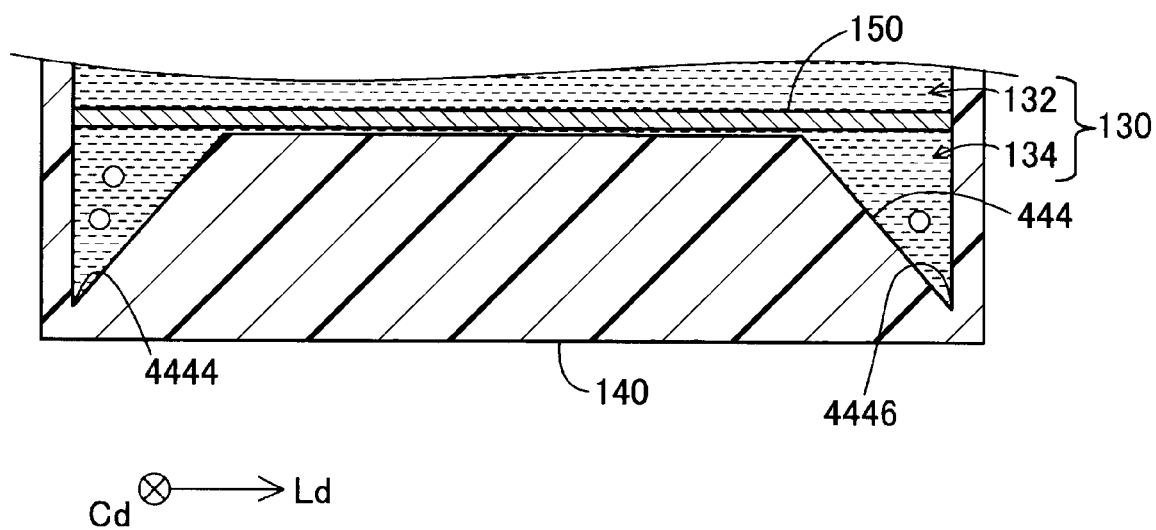
FIG. 7 is a schematic sectional view illustrating a section along VII-VII in FIG. 6.

FIG. 7 is a schematic sectional view illustrating a section along VII-VII in FIG. 6. Tapered structures are formed in one end portion 4444 and the other end portion 4446 of the projection 444. Specifically, a distance between the projection 444 and the filter 150 increases toward the one end portion 4444 and the other end portion 4446 of the projection 444.

According to the third embodiment described above, the same effects as those provided by the above-described first embodiment can be obtained regarding points having the same configurations as those in the first embodiment. With the filter unit 400 according to the third embodiment, the projection 444 has the tapered structure, so that the air bubbles can be made to easily flow.

D. Reference Example

Figure 8:
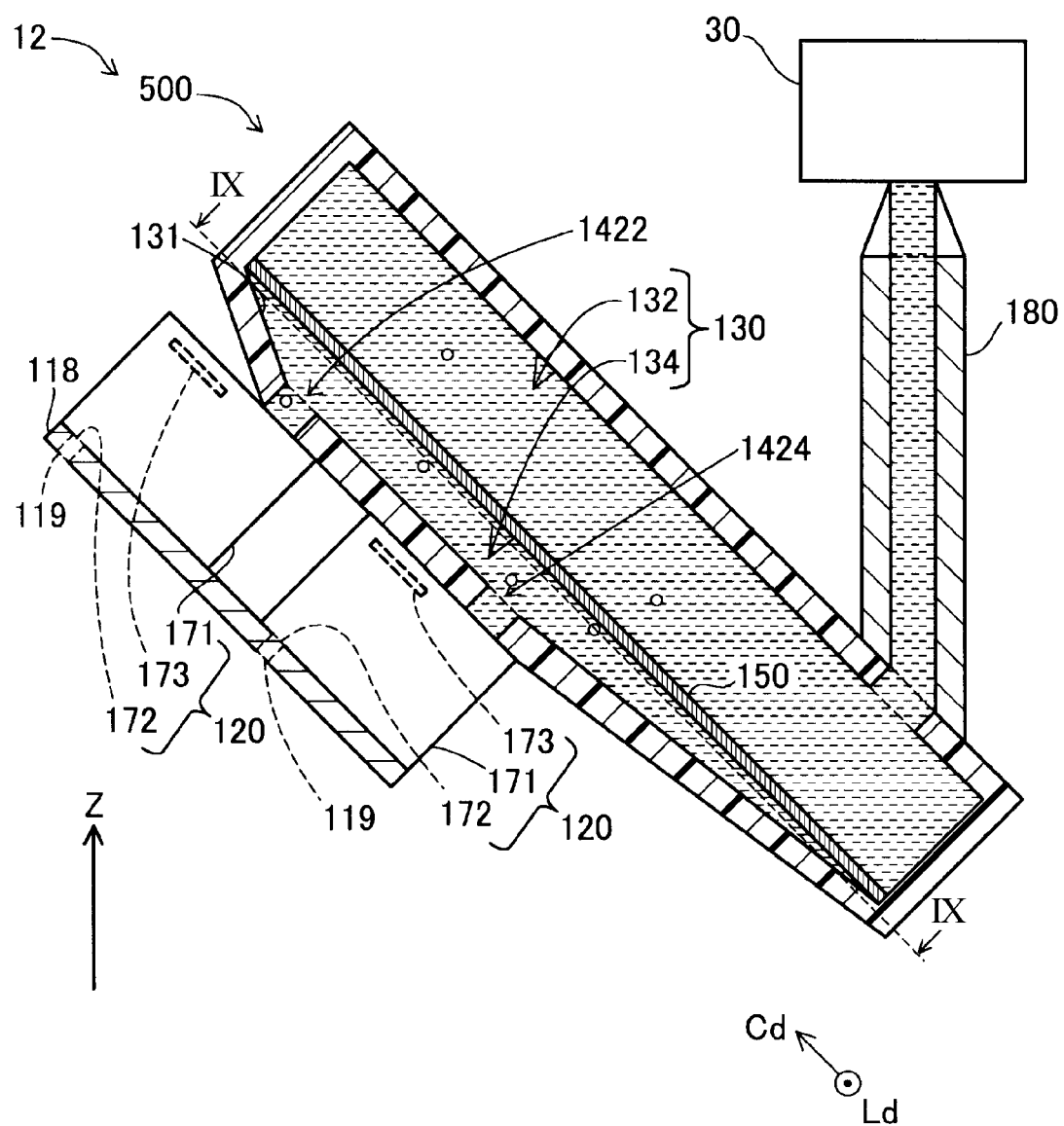
FIG. 8 is a schematic view illustrating the configuration of a head unit according to a reference example.
Figure 9:
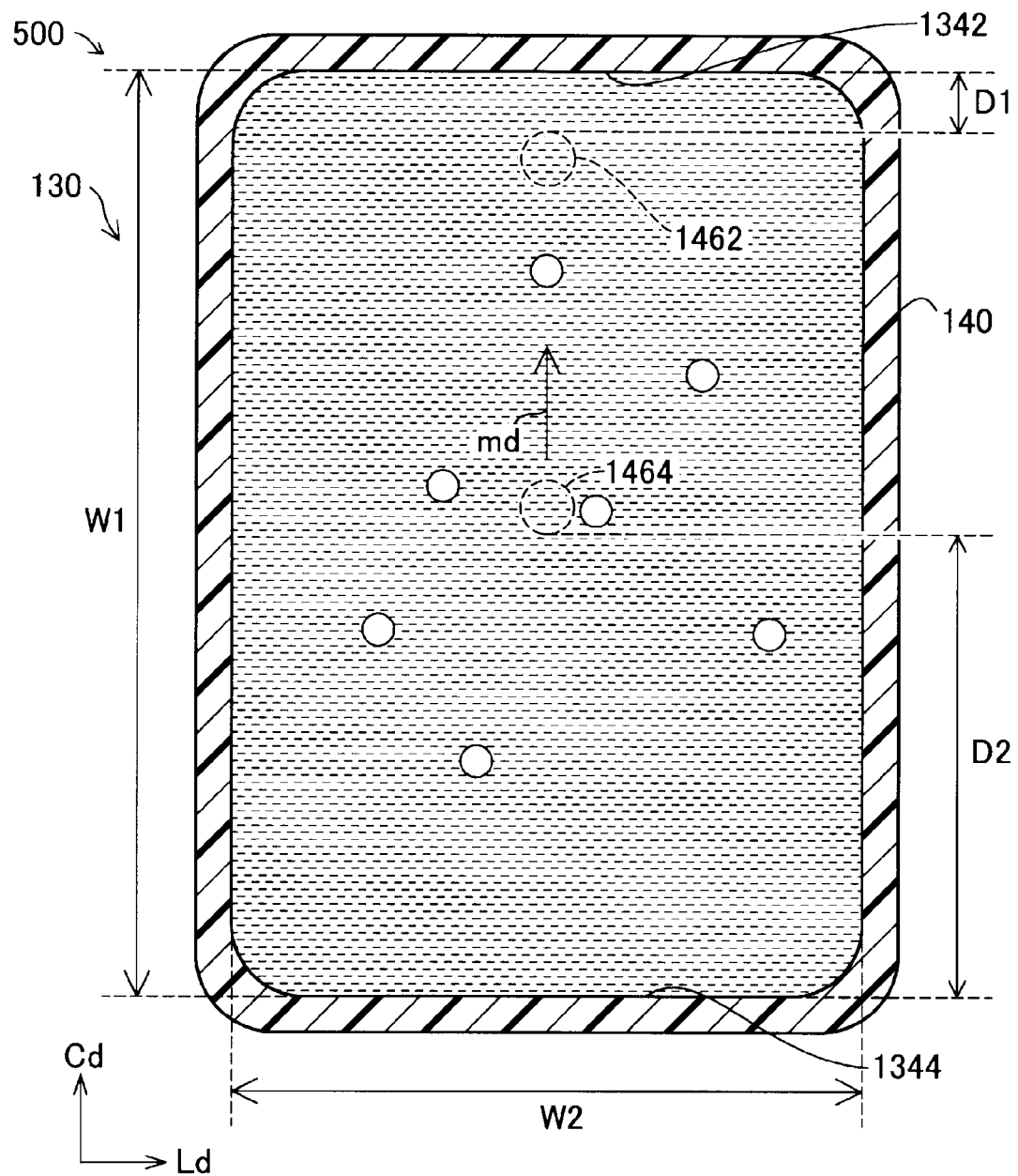
FIG. 9 is a schematic sectional view illustrating a section along IX-IX in FIG. 8.

FIG. 8 is a schematic view of a filter unit 500 according to a reference example. FIG. 9 is a schematic sectional view illustrating a section along IX-IX in FIG. 8. As illustrated in FIG. 8 and FIG. 9, the filter unit 500 according to the reference example is different in absence of projection and in a position at which the second coupling port 1464 is provided. Specifically, as illustrated in FIG. 9, the distance d2 from the other end portion 1344 of the end portions of the filter chamber 130 in the Cd direction, which is located on the second coupling port 1464 side, to the second coupling port 1464 is larger than half the first maximum width W1. With this configuration, even when no projection is provided, the filter unit 500 can improve discharge performance of air bubbles on the one end portion 1342 side of the second space 134.

E. Other Embodiments

E1. First Another Embodiment

Figure 10:
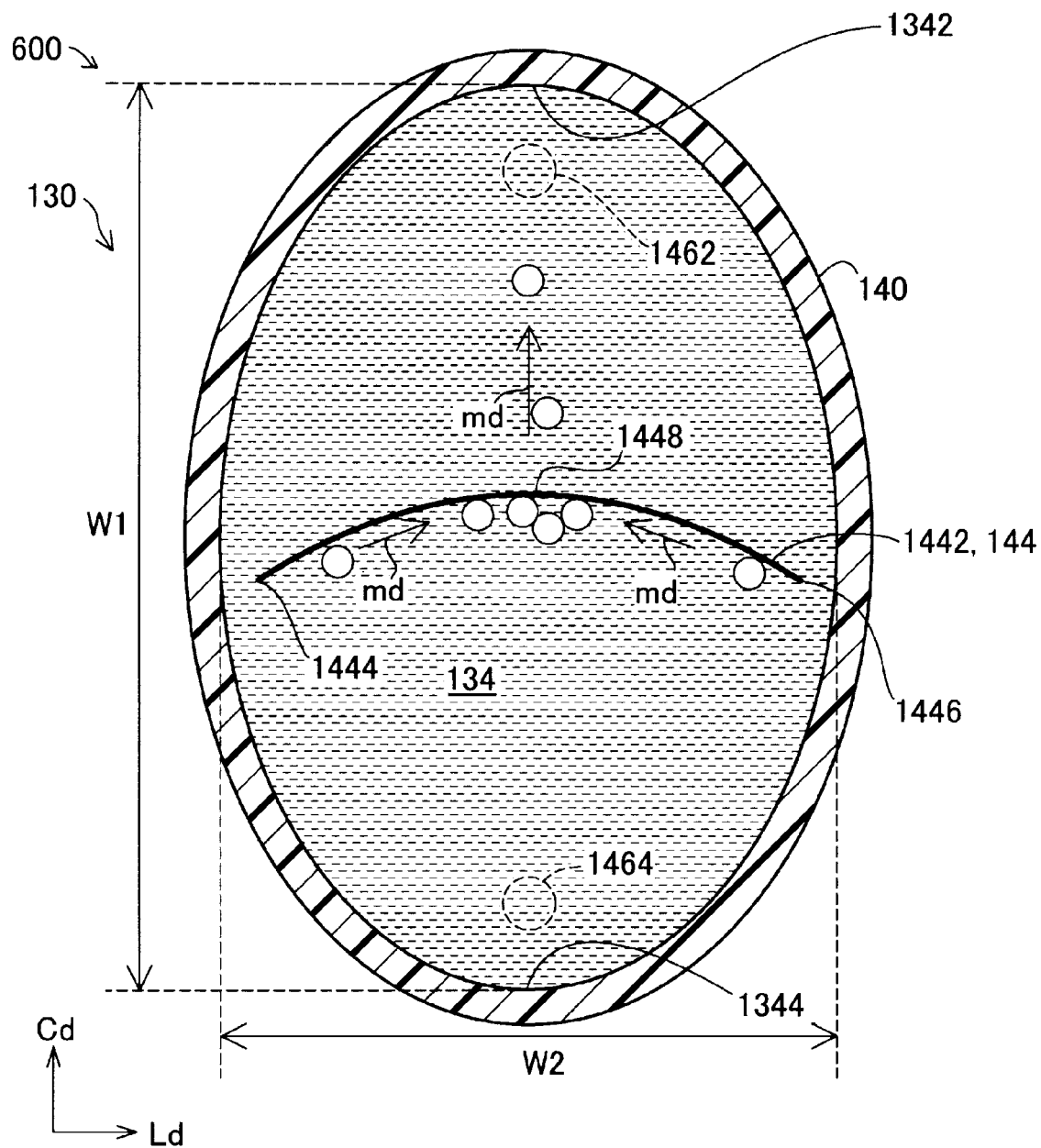
FIG. 10 is a schematic view of a filter unit according to first another embodiment.

FIG. 10 is a schematic view of a filter unit 600 according to first another embodiment. In the above embodiments, the shape of the second space 134 when the second space 134 side is viewed from the first space 132 side can be changed as appropriate. For example, as illustrated in FIG. 10, an elliptical shape may also be used.

E2. Second Another Embodiment

In the above embodiments, when the second space 134 side is viewed from the first space 132 side, the maximum width W1 of the filter chamber 130 in the Cd direction is larger than the maximum width W2 of the filter chamber 130 in the Ld direction. However, when the second space 134 side is viewed from the first space 132 side, the maximum width W1 of the filter chamber 130 in the Cd direction may not be larger than the maximum width W2 of the filter chamber 130 in the Ld direction. In this case, when the second space 134 side is viewed from the first space 132 side, the maximum width of the filter 150 in the Cd direction may not be larger than the maximum width of the filter 150 in the Ld direction.

E3. Third Another Embodiment

In the above embodiments, the distance D1 from the one end portion 1342 of the end portions of the filter chamber 130 in the Cd direction, which is located on the first coupling port 1462 side, to the first coupling port 1462 is smaller than half the first maximum width W1. However, the distance D1 from the one end portion 1342 to the first coupling port 1462 is not limited to this. For example, the distance D1 may be equal to or larger than half the first maximum width W1.

E4. Fourth Another Embodiment

In the above embodiments, the distance D2 from the other end portion 1344 of the end portions of the filter chamber 130 in the Cd direction, which is located on the second coupling port 1464 side, to the second coupling port 1464 is smaller than one fourth the first maximum width W1. However, the distance D2 from the other end portion 1344 to the second coupling port 1464 is not limited to this. For example, the distance D2 may be equal to or larger than one fourth the first maximum width W1.

E5. Fifth Another Embodiment

In the above embodiments, the head unit 12 has the configuration in which the six head chips 121 to 126 are aligned in a row in the Ld direction. However, the head unit 12 is not limited to this. For example, the number of head chips provided in the head unit 12 may be equal to or more than seven or equal to or less than five. Further, the head unit 12 may have the configuration in which the head chips 121 to 126 are aligned in two rows in the Ld direction.

E6. Sixth Another Embodiment

In the above embodiments, in the head unit 12, the plurality of head chips 120 is arranged along the direction orthogonal to the direction from the second coupling port 1464 toward the first coupling port 1462. However, the direction in which the plurality of head chips 120 is arranged is not limited thereto. For example, the plurality of head chips 120 may be arranged along a direction intersecting the direction from the second coupling port 1464 toward the first coupling port 1462, for example, along a direction from the second coupling port 1464 toward the first coupling port 1462.

E7. Seventh Another Embodiment

In the above embodiments, the head chips 120 including the different energy generating elements 173 are coupled to the first coupling port 1462 and the second coupling port

1464, but the disclosure is not limited thereto. For example, the head chips 120 may have the configuration in which the liquid flow path downstream of the first coupling port 1462 and the liquid flow path downstream of the second coupling port 1464 join with each other and the liquid flows into one head chip 120.

E8. Eighth Another Embodiment

In the above embodiments, the head chips 120 have the configuration in which the filter units 100 to 600 and the head chips 120 are integrated with each other, but the disclosure is not limited to this configuration. For example, the head chips 120 may have the configuration in which the filter units 100 to 600 and the head chips 120 are separated from each other.

E9. Ninth Another Embodiment

In the above embodiments, the coupling ports provided in the filter chamber 130 are two of the first coupling port 1462 and the second coupling port 1464, but the disclosure is not limited thereto. For example, there may be equal to or more than three coupling ports provided in the filter chamber 130. In this case of being included in the liquid discharging apparatus 1, it is sufficient that positions of at least two coupling ports of the equal to or more than three coupling ports are different in the vertical direction (Z-axis direction). Out of the two coupling ports the positions of which are different in the vertical direction (Z-axis direction), the coupling port located on the upper side is the first coupling port and the coupling port located on the lower side is the second coupling port. Further, when there are equal to or more than three coupling ports provided in the filter chamber 130, equal to or more than three head chips 120 may also be provided.

Even in the first to ninth another embodiments described above, the same effects as those provided by the above-described embodiments can be obtained regarding points having the same configurations as those in the above embodiments.

C10. Tenth Another Embodiment

The present disclosure is not limited to the liquid discharging apparatus that discharges ink and may be applied to any liquid discharging apparatuses that discharge liquid other than ink. For example, the present disclosure is applicable to various types of liquid discharging apparatuses as follows:

1. an image recording apparatus such as a facsimile apparatus, 2. a coloring material discharging apparatus usable for manufacturing a color filter for an image display device such as a liquid crystal display, 3. an electrode material discharging apparatus usable for electrode formation of an organic electro luminescence (EL) display, a field emission display (FED), or the like, 4. a liquid discharging apparatus that discharges liquid containing a bioorganic substance to be used for manufacturing a biochip, 5. a sample discharging apparatus as a precision pipette, 6. a lubricating oil discharging apparatus, 7. a resin liquid discharging apparatus, 8. a liquid discharging apparatus that pinpoint-discharges lubricating oil to a precision machine such as a clock or a camera, or the like, 9. a liquid discharging apparatus that discharges a transparent resin solution such as an ultraviolet curable resin solution onto a substrate in order to form a hemispherical microlens (optical lens) or the like to be used for an optical communication device or the like, 10. a liquid discharging apparatus that discharges an acid or alkali etching solution for etching a substrate or the like, and 11. a liquid discharging apparatus including a liquid discharging head that discharges any other minute amount of liquid droplets.

The "liquid" may be any materials that can be consumed by the liquid discharging apparatus. For example, the "liquid" may be any materials in a liquid phase. Materials in a liquid state having high viscosity or low viscosity and materials in a fluid state such as a sol, gel water, other inorganic solvents, an organic solvent, a solution, a liquid resin, and a liquid metal (molten metal) may also be included in the "liquid". Further, the "liquid" is not limited to liquid as one state of a material but includes a solution, a dispersion, or a mixture of particles of a functional material made of a solid material such as pigment or metal particles. Typical examples of the liquid include ink, liquid crystal, and the like. Here, ink is intended to encompass various liquid compositions such as general aqueous ink and oil ink, gel ink, hot melt ink, and the like.

The present disclosure is not limited to the embodiments described above and can be implemented in various configurations in a range without departing from the gist thereof. For example, the technical features in the embodiments corresponding to the technical features in the aspects described in the summary can be appropriately replaced or combined in order to solve some or all of the problems described above or to achieve some or all of the effects described above. If the technical features are not described as essential in the specification, they may be deleted as appropriate.

1. According to an aspect of the present disclosure, a filter unit is provided. The filter unit includes a flow path member configuring a filter chamber through which liquid flows, and a filter partitioning the filter chamber into a first space located upstream in a liquid flow direction and a second space located downstream in the liquid flow direction, in which a first recess and a second recess as two recesses recessed in a direction of being farther from the filter are formed in a wall surface of the second space in a wall surface of the flow path member, a projection projecting toward the filter is formed between the first recess and the second recess in the wall surface, a first coupling port through which the liquid flows to an outside of the filter chamber from the second space is formed in the first recess, a second coupling port through which the liquid flows to the outside of the filter chamber from the second space is formed in the second recess, the projection extends in a direction of crossing between the first coupling port and the second coupling port when a second space side is viewed from a first space side, and when a portion of the projection between one end portion and another end portion in the crossing direction represents a front end portion, a distance between the first coupling port and the front end portion in a first direction, among directions in a plane of the filter, as a direction toward the first coupling port from the second coupling port is smaller than a distance between the first coupling port and the one end portion in the first direction and is smaller than a distance between the first coupling port and the other end portion in the first direction.

With the filter unit of this aspect, when the filter unit is used such that the first coupling port is located on the upper side relative to the second coupling port, air bubbles moving from the second coupling port side to the first coupling port side move along the projection. Further, since the flow path section of the second space can be reduced between the filter and the projection, the flow velocity of the air bubbles between the filter and the projection increases. Therefore, movement of the air bubbles to the first coupling port is facilitated. As a result, the air bubbles are highly likely to be discharged through the first coupling port before reaching the upper end portion of the second space. Accordingly, it is possible to suppress accumulation of the air bubbles in the upper end portion of the filter chamber.

2. In the filter unit of the above aspect, when the second space side is viewed from the first space side, a maximum width of the filter in the first direction may be larger than a maximum width of the filter in a second direction as a direction orthogonal to the first direction among the directions in the plane of the filter. When the filter unit is used such that the first coupling port is located on the upper side relative to the second coupling port, it is difficult to move the air bubbles in the second direction in comparison with the first direction in which the air bubbles are movable by buoyancy. However, with the filter unit of this aspect, when the area of the filter surface of the filter is the same, the maximum width of the filter in the second direction can be reduced. By reducing the maximum width of the filter in the second direction, it is possible to facilitate the movement of the air bubbles to the first coupling port. Accordingly, it is possible to further suppress the accumulation of the air bubbles in the upper end portion of the filter chamber.

3. In the filter unit of the above aspect, when the second space side is viewed from the first space side, a distance from one end portion of end portions of the filter in the first direction, the one end portion being located on a first coupling port side, to the first coupling port may be smaller than half a distance from the one end portion to another end portion of the filter. With the filter unit of this aspect, when the filter unit is used such that the first coupling port is located on the upper side in the vertical direction relative to the second coupling port, as compared to when the distance from the one end portion to the first coupling port is larger than half the distance from the one end portion to the other end portion, a region of the second space, which is located on the upper side relative to the first coupling port, can be reduced. Accordingly, it is possible to further suppress the accumulation of the air bubbles in the upper end portion of the filter chamber.

4. In the filter unit of the above aspect, when the second space side is viewed from the first space side, a distance from another end portion of end portions of the filter in the first direction, the other end portion being located on a second coupling port side, to the second coupling port may be smaller than one fourth a distance from the other end portion to one end portion of the filter. With the filter unit of this aspect, a region of the filter chamber on the other end portion side relative to the second coupling port can be reduced. Accordingly, even when the filter unit is used such that the first coupling port and the second coupling port are horizontal, it is possible to suppress accumulation of the air bubbles in the filter chamber on the other end portion side.

5. According to another aspect of the present disclosure, there is provided a liquid discharging head that discharges liquid to an outside. The liquid discharging head includes the filter unit according to the above aspect, a plurality of nozzles coupled to the first coupling port and the second coupling port and having openings for discharging, to the outside, the liquid flowing from the filter unit through the first coupling port and the second coupling port, and an energy generating element applying, to the liquid, power for the liquid being discharged to the outside.

The liquid discharging head of this aspect includes the filter unit of the above aspect. Therefore, when the filter unit is used such that the first coupling port is located on the upper side in the vertical direction relative to the second coupling port, air bubbles moving from the second coupling port side to the first coupling port side move along the projection. Further, since the flow path section of the second space can be reduced between the filter and the projection, the flow velocity of the air bubbles between the filter and the projection increases. Therefore, movement of the air bubbles to the first coupling port is facilitated. As a result, the air bubbles are highly likely to be discharged through the first coupling port before reaching the upper end portion of the second space. Accordingly, it is possible to suppress discharge failure of the liquid discharging head due to accumulation of the air bubbles in an upper end portion of the filter chamber.

6. In the liquid discharging head of the above aspect, the plurality of nozzles may include a first nozzle coupled to the filter chamber via the first coupling port and a second nozzle coupled to the filter chamber via the second coupling port, and the energy generating element may include a first energy generating element applying the power to the liquid to be discharged through the first nozzle and a second energy generating element applying the power to the liquid which to be discharged through the second nozzle. With the liquid discharging head of this aspect, it is possible to suppress influences by the power which is applied at one coupling port side between the first coupling port side and the second coupling port side on the other coupling port side.

7. In the liquid discharging head of the above aspect, a plurality of filter chambers, each of which is the filter chamber through which liquid flows, may be provided, when the second space side is viewed from the first space side, a maximum width in the first direction of the filter arranged in each of the filter chambers may be larger than a maximum width in a second direction of the filter as a direction orthogonal to the first direction among the directions in the plane of the filter arranged in each of the filter chambers, and the plurality of filter chambers may be arranged along the second direction. With the filter unit of this aspect, when the area of the filter surface of the filter is the same, the maximum width of the filter in the second direction can be reduced. By reducing the maximum width of the filter in the second direction, it is possible to facilitate the movement of the air bubbles to the first coupling port. Accordingly, it is possible to further suppress the accumulation of the air bubbles in the upper end portion of the filter chamber. Further, as compared to when a second value is larger than a first value, it is easy to reduce the size of the liquid discharging head in the second direction. Further, it is possible for different types of liquid to flow through the plurality of filter chambers, respectively.

8. According to another aspect of the present disclosure, there is provided a liquid discharging apparatus. The liquid discharging apparatus includes the liquid discharging head according to the above aspect, and a transportation mechanism having a motor and transporting a medium receiving the liquid discharged from the liquid discharging head.

The liquid discharging apparatus of this aspect includes the liquid discharging head of the above aspect. Therefore, when the filter unit is used such that the first coupling port is located on the upper side in the vertical direction relative to the second coupling port, air bubbles moving from the second coupling port side to the first coupling port side move along the projection. Further, since the flow path section of the second space can be reduced between the filter and the projection, the flow velocity of the liquid between the filter and the projection increases, so that the movement of the air bubbles with flow of the liquid in the second space is facilitated. Therefore, the movement of the air bubbles to the first coupling port is facilitated. As a result, the air bubbles are highly likely to be discharged through the first coupling port before reaching the upper end portion of the second space. Accordingly, it is possible to suppress discharge failure of the liquid discharging apparatus due to accumulation of the air bubbles in an upper end portion of the filter chamber.

9. According to another aspect of the present disclosure, there is provided a liquid discharging apparatus. The liquid discharging apparatus includes a flow path member configuring a filter chamber through which liquid flows, a filter partitioning an internal space of the filter chamber into a first space located upstream in a liquid flow direction and a second space located downstream in the liquid flow direction, a liquid discharging head coupled to the filter chamber and discharging the liquid flowing from the filter chamber, and a motor for transporting a medium receiving the discharged liquid, in which the filter is arranged so as to intersect a plane perpendicular to a vertical direction, a first coupling port and a second coupling port as two openings for coupling the second space and the liquid discharging head are formed in a wall surface of the second space in a wall surface of the flow path member, positions of the first coupling port and the second coupling port are different in the vertical direction, and when a second space side is seen from a first space side, a maximum width of the filter in a first direction, among directions in a plane of the filter, as a direction from the first coupling port toward the second coupling port is larger than a maximum width of the filter in a second direction as a direction orthogonal to the first direction among the directions in the plane of the filter.

With the liquid discharging apparatus of this aspect, when the area of the filter surface of the filter is the same, the maximum width of the filter in the second direction can be reduced. When the filter unit is used such that the first coupling port is located on the upper side in the vertical direction relative to the second coupling port, it is difficult to move air bubbles in the second direction in comparison with the first direction in which the air bubbles are movable by buoyancy. By reducing the maximum width of the filter in the second direction, it is possible to facilitate the movement of the air bubbles to the first coupling port. Accordingly, it is possible to suppress discharge failure of the liquid discharging apparatus due to accumulation of the air bubbles in an upper end portion of the filter chamber.

10. In the liquid discharging apparatus of the above aspect, a first recess and a second recess as two recesses recessed in a direction of being farther from the filter may be formed in the wall surface, a projection projecting toward the filter may be formed between the first recess and the second recess in the wall surface, the first coupling port may be formed in the first recess, the second coupling port may be formed in the second recess, and the projection may extend in a direction of crossing between the first coupling port and the second coupling port when the second space side is viewed from the first space side. With the liquid discharging apparatus of this aspect, it is possible to reduce the flow path section of the filter chamber between the first coupling port and the second coupling port. Therefore, it is possible to increase the flow velocity of the liquid between the first coupling port and the second coupling port. As a result, movement of the air bubbles with flow of the liquid in the second space is prompted. Accordingly, discharge of the air bubbles is facilitated.

11. In the liquid discharging apparatus of the above aspect, the projection may have a portion, between one end portion and another end portion, closer to the first coupling port than a straight line connecting the one end portion and the other end portion of the projection in the crossing direction when the second space side is viewed from the first space side. With the liquid discharging apparatus of this aspect, when the area of the filter surface of the filter is the same, the maximum width of the filter in the second direction can be reduced. When the filter unit is used such that the first coupling port is located on the upper side in the vertical direction relative to the second coupling port, it is difficult to move the air bubbles in the second direction in comparison with the first direction in which the air bubbles are movable by buoyancy. By reducing the maximum width of the filter in the second direction, it is possible to facilitate the movement of the air bubbles to the first coupling port.

12. In the liquid discharging apparatus of the above aspect, when the second space side is viewed from the first space side, a distance from one end portion, which is located on the first coupling port side, of end portions of the filter in the first direction to the first coupling port may be smaller than half a distance from the one end portion to another end portion of the end portions of the filter. With the liquid discharging apparatus of this aspect, the distance from the one end portion to a position overlapping the first coupling port is smaller than half the distance between the one end portion and the other end portion. Therefore, when the filter unit is used such that the first coupling port is located on the upper side in the vertical direction relative to the second coupling port, as compared to when the distance from the one end portion to the position overlapping the first coupling port is larger than half the distance from the one end portion to the other end portion, a region of the second space, which is located on the upper side relative to the first coupling port, can be reduced. Accordingly, it is possible to further suppress the accumulation of the air bubbles in the upper end portion of the filter chamber.

13. In the liquid discharging apparatus of the above aspect, when the second space side is viewed from the first space side, a distance from another end portion, which is located on the second coupling port side, of end portions of the filter in the first direction to the second coupling port may be smaller than one fourth a distance from the other end portion to one end portion of the end portions of the filter. In the liquid discharging apparatus of this aspect, the distance from the other end portion to the position overlapping the second coupling port is smaller than one fourth the distance from the other end portion to the one end portion. Therefore, when the filter unit is used such that the first coupling port and the second coupling port are horizontal, a region of the filter chamber on the other end side relative to the second coupling port can be reduced. Accordingly, it is possible to suppress accumulation of the air bubbles in the filter chamber on the other end portion side.

14. In the liquid discharging apparatus of the above aspect, a plurality of filter chambers, each of which is the filter chamber through which liquid flows, may be provided, and the plurality of filter chambers may be arranged along the second direction. With the liquid discharging apparatus of this aspect, when the second space is viewed from the first space side, a first value is larger than a second value, and the plurality of filter chambers are arranged along the second direction. Therefore, it is possible to reduce the possibility that air bubbles which have flowed into the second space reach an upper end portion of the filter chamber while avoiding the first coupling port. Accordingly, it is possible to further suppress the accumulation of the air bubbles in the upper end portion of the filter chamber. Further, as compared to when the second value is larger than the first value, it is easy to reduce the size of the liquid discharging apparatus in the second direction.

15. In the liquid discharging apparatus of the above aspect, the liquid discharging head may include a nozzle having an opening for discharging the liquid to an outside, and an energy generating element applying, to the liquid, power for the liquid being discharged to the outside, and the nozzle may include a first nozzle coupled to the filter chamber via the first coupling port and a second nozzle coupled to the filter chamber via the second coupling port, and the energy generating element may include a first energy generating element applying the power to the liquid to be discharged through the first nozzle and a second energy generating element applying the power to the liquid to be discharged through the second nozzle. With the liquid discharging apparatus of this aspect, the energy generating element includes the first energy generating element applying the power to the liquid to be discharged through the first nozzle and the second energy generating element applying the power to the liquid to be discharged through the second nozzle. Therefore, it is possible to suppress influences by the power which is applied at one coupling port side between the first coupling port side and the second coupling port side on the other coupling port side.

The present disclosure can also be implemented in various forms other than the filter unit, the liquid discharging head, and the liquid discharging apparatus. For example, the present disclosure can be implemented in a form of a method of manufacturing a filter unit or a liquid discharging head.

What is claimed is:

1. A filter unit comprising:
    a flow path member configuring a filter chamber through which liquid flows; and
    a filter partitioning the filter chamber into a first space located upstream in a liquid flow direction and a second space located downstream in the liquid flow direction, wherein
    a first recess and a second recess as two recesses recessed in a direction of being farther from the filter are formed in a wall surface of the second space in a wall surface of the flow path member,
    a projection projecting toward the filter is formed between the first recess and the second recess in the wall surface,
    a first coupling port through which the liquid flows to an outside of the filter chamber from the second space is formed in the first recess,
    a second coupling port through which the liquid flows to the outside of the filter chamber from the second space is formed in the second recess,
    the projection extends in a direction of crossing between the first coupling port and the second coupling port when a second space side is viewed from a first space side, and
    when a portion of the projection between one end portion and another end portion in the crossing direction represents a front end portion, a distance between the first coupling port and the front end portion in a first direction, among directions in a plane of the filter, as a direction toward the first coupling port from the second coupling port is smaller than a distance between the first coupling port and the one end portion in the first direction and is smaller than a distance between the first coupling port and the other end portion in the first direction.

2. The filter unit according to claim 1, wherein
    when the second space side is viewed from the first space side, a maximum width of the filter in the first direction is larger than a maximum width of the filter in a second direction as a direction orthogonal to the first direction among the directions in the plane of the filter.

3. The filter unit according to claim 1, wherein
    when the second space side is viewed from the first space side, a distance from one end portion of end portions of the filter in the first direction, the one end portion being located on a first coupling port side, to the first coupling port is smaller than half a distance from the one end portion to another end portion of the filter.

4. The filter unit according to claim 1, wherein
    when the second space side is viewed from the first space side, a distance from another end portion of end portions of the filter in the first direction, the other end portion being located on a second coupling port side, to the second coupling port is smaller than one fourth a distance from the other end portion to one end portion of the filter.

5. A liquid discharging head that discharges liquid to an outside, comprising:
    the filter unit according to claim 1;
    a plurality of nozzles coupled to the first coupling port and the second coupling port and having openings for discharging, to the outside, the liquid flowing from the filter unit through the first coupling port and the second coupling port; and
    an energy generating element applying, to the liquid, power for the liquid being discharged to the outside.

6. The liquid discharging head according to claim 5, wherein
    the plurality of nozzles includes a first nozzle coupled to the filter chamber via the first coupling port and a second nozzle coupled to the filter chamber via the second coupling port, and
    the energy generating element includes a first energy generating element applying the power to the liquid to be discharged through the first nozzle and a second energy generating element applying the power to the liquid to be discharged through the second nozzle.

7. The liquid discharging head according to claim 5, wherein
    a plurality of filter chambers, each of which is the filter chamber through which liquid flows, is provided,
    when the second space side is viewed from the first space side, a maximum width in the first direction of the filter arranged in each of the filter chambers is larger than a maximum width in a second direction of the filter as a direction orthogonal to the first direction among the directions in the plane of the filter arranged in each of the filter chambers, and
    the plurality of filter chambers is arranged along the second direction.

8. A liquid discharging apparatus comprising:
    the liquid discharging head according to claim 5; and
    a transportation mechanism having a motor and transporting a medium receiving the liquid discharged from the liquid discharging head.

9. A liquid discharging apparatus comprising:
    a flow path member configuring a filter chamber through which liquid flows;

a filter partitioning an internal space of the filter chamber into a first space located upstream in a liquid flow direction and a second space located downstream in the liquid flow direction;

a liquid discharging head coupled to the filter chamber and discharging the liquid flowing from the filter chamber; and a motor for transporting a medium receiving the discharged liquid, wherein the filter is arranged so as to intersect a plane perpendicular to a vertical direction, a first coupling port and a second coupling port as two openings for coupling the second space and the liquid discharging head are formed in a wall surface of the second space in a wall surface of the flow path member, positions of the first coupling port and the second coupling port are different in the vertical direction, and when a second space side is seen from a first space side, a maximum width of the filter in a first direction, among directions in a plane of the filter, as a direction from the first coupling port toward the second coupling port is larger than a maximum width of the filter in a second direction as a direction orthogonal to the first direction among the directions in the plane of the filter.

10. The liquid discharging apparatus according to claim 9, wherein a first recess and a second recess as two recesses recessed in a direction of being farther from the filter are formed in the wall surface, a projection projecting toward the filter is formed between the first recess and the second recess in the wall surface, the first coupling port is formed in the first recess, the second coupling port is formed in the second recess, and the projection extends in a direction of crossing between the first coupling port and the second coupling port when the second space side is viewed from the first space side.

11. The liquid discharging apparatus according to claim 10, wherein the projection has a portion, between one end portion and another end portion, closer to the first coupling port than a straight line connecting the one end portion and the other end portion of the projection in the crossing direction when the second space side is viewed from the first space side.

12. The liquid discharging apparatus according to claim 9, wherein when the second space side is viewed from the first space side, a distance from one end portion, which is located on the first coupling port side, of end portions of the filter in the first direction to the first coupling port is smaller than half a distance from the one end portion to another end portion of the end portions of the filter.

13. The liquid discharging apparatus according to claim 9, wherein when the second space side is viewed from the first space side, a distance from another end portion, which is located on the second coupling port side, of end portions of the filter in the first direction to the second coupling port is smaller than one fourth a distance from the other end portion to one end portion of the end portions of the filter.

14. The liquid discharging apparatus according to claim 9, wherein a plurality of filter chambers, each of which is the filter chamber through which liquid flows, is provided and the plurality of filter chambers is arranged along the second direction.

15. The liquid discharging apparatus according to claim 9, wherein the liquid discharging head includes a nozzle having an opening for discharging the liquid to an outside and an energy generating element applying, to the liquid, power for the liquid being discharged to the outside, the nozzle includes a first nozzle coupled to the filter chamber via the first coupling port and a second nozzle coupled to the filter chamber via the second coupling port, and the energy generating element includes a first energy generating element applying the power to the liquid to be discharged through the first nozzle and a second energy generating element applying the power to the liquid to be discharged through the second nozzle.

* * * * *